United States Patent
Bugajski et al.

(10) Patent No.: US 7,182,891 B2
(45) Date of Patent: Feb. 27, 2007

(54) NON-BASIC REFRACTORY COMPOUND AS WELL AS ITS USES

(75) Inventors: Malgorzata Bugajski, Leoben (AT);
Karl-Heinz Dott, Taunusstein (DE);
Alfons Lueftenegger, Wien (AT)

(73) Assignee: Refractory Intellectual Property GmbH & Co. KG, Vienna (AT)

( * ) Notice: Subject to any disclaimer, the term of this patent is extended or adjusted under 35 U.S.C. 154(b) by 128 days.

(21) Appl. No.: 10/712,117

(22) Filed: Nov. 12, 2003

(65) Prior Publication Data

US 2004/0102307 A1    May 27, 2004

(30) Foreign Application Priority Data

Nov. 25, 2002    (DE) ............................... 102 55 068

(51) Int. Cl.
*F27D 1/16*    (2006.01)

(52) U.S. Cl. .................. 264/30; 427/140; 427/180; 501/94; 501/99; 501/100; 501/101; 501/102; 501/106; 501/126; 501/127; 501/128; 501/130; 501/133; 501/141; 501/142

(58) Field of Classification Search ............... 501/94, 501/99, 100, 101, 102, 106, 126, 127, 128, 501/130, 133, 141, 142
See application file for complete search history.

(56) References Cited

U.S. PATENT DOCUMENTS 4,056,398 A * 11/1977 Rechter et al. ............. 501/131
4,334,029 A * 6/1982 Naito et al. ................. 501/109
4,900,603 A * 2/1990 Boily et al. .................. 428/77

FOREIGN PATENT DOCUMENTS

| DE | 31 42 021 A1 | 6/1982 |
| EP | 0 558 675 B1 | 1/1995 |
| EP | 0 447 562 B1 | 5/1995 |
| JP | 57088083 A * | 6/1982 |
| JP | 57094507 A * | 6/1982 |
| JP | 61044771 A * | 3/1986 |
| JP | 01131077 A | 5/1989 |
| JP | 09142945 A | 6/1997 |
| JP | 10212169 A * | 8/1998 |
| JP | 2000344581 A | 12/2000 |

OTHER PUBLICATIONS

O'Bannon, Dictionary of Ceramic Science and Engineering, p. 24, 1984.*
Perry, Perry's Chemical Engineers' Handbook, Sixth Ed., 1984, p. 21-15.*
O'Bannon, Dictionary of Ceramic Science and Engineering, 1984, p. 150, 230.*
Shigetoshi Uto, et al., "Flowability and Hardening Time of Resin-Bonded Hot Repair Mixes", Taikabutsu Overseas, 1996, 39-47, vol. 17, No. 1.

* cited by examiner

*Primary Examiner*—David Sample
(74) *Attorney, Agent, or Firm*—Christopher L. Parmelee; Walker & Jocke LPA

(57) ABSTRACT

This invention concerns a non-basic refractory batch as well as its use.

15 Claims, No Drawings

NON-BASIC REFRACTORY COMPOUND AS WELL AS ITS USES

DESCRIPTION

The invention concerns a non-basic refractory batch as well as its uses.

Refractory ceramic batches (mixtures) are used, among others, for manufacturing high-temperature-resistant linings of industrial equipment, in particular vessels for the manufacture and treatment of metallurgical melts. Linings of this sort can be applied either as monolithic batches (for example, using casting or spraying processes). However the batches may also be fabricated into refractory molded shapes, for example, into bricks, which then, as the case may be, are assembled by means of adhesive or mortar into a lining. The refractory molded shapes can also be large-sized construction parts.

In all cases there are manifestations of wear of the refractory material. The cause for this may be: the high temperature stresses, frequent temperature changes, and/or chemical (metallurgical) actions, for example by corrosive slags.

In order to increase the useful life of the still useable refractory material, a known practice is to repair the damaged locations. This presents no problem when the defective refractory material is "cold." On the other hand, there is great difficulty in repairing refractory ceramic construction parts when these are (still) hot. Neither humans nor machines can be employed at the possible high temperatures of more than 1,000° C. in the immediate vicinity of the hot surfaces. It would, however, take hours or days, to let, for instance, a ladle, a converter or such, cool after the last melt has been removed, so as to arrive at an acceptable temperature for the repair procedures.

For that reason there have been many attempts to carry out this kind or repairs on the defective, still hot, refractory material.

According to TAIKABUTSU OVERSEAS, Vol. 17 No. 1, pp. 39–47 there are essentially two types of batch mixes available for this purpose:
1. Aqueous casting batches
2. Non-aqueous mixtures.

Aqueous mixtures, per a), are applied to the damaged places of the refractory lining. This could entail problems due to suddenly evaporating water, which may even lead to explosions (water vapor explosions). While aqueous repair batches harden quickly, their durability is clearly inferior to that of non-aqueous mixtures, per b). There may also be problems due to sudden evaporation of the water. With these batches, the binding agents are carbonized. The carbon binder lends an elevated heat resistance. These non-aqueous mixtures work with the use of tar or resins. A disadvantage is the fact that the batches often do not flow sufficiently when applied to the damaged refractory material, so that holes, tears or such are not 100% filled.

A kind of "middle road" between a) and b) is described in EP 0 558 675 B1, which recommends a dry refractory compound, and is, in other words, built upon a dry refractory ceramic oxide, but includes, in addition, a component that contains bound water. If this mixture is heated while being applied to the damaged refractory lining, the crystalline water is released, and has the effect of allowing the originally dry refractory compound to flow. The refractory material is basic; that is, it consists predominantly of MgO.

The crystalline water content is critical for the fluidity of the batch. Accordingly, the amount of water required is very hard to adjust. Moreover, the mixture only becomes fluid at fairly high temperatures. It is actually unsuitable therefore, where damaged places outside a horizontal floor area need to be filled in.

The EP 0 447 562 B1 also recommends a refractory batch (mixture) which, in addition to the required refractory compound, includes a phenolic resin, with the batch prepared as a slip which is fluid even at normal temperatures (ambient temperature). The wear resistance of this "slip repair batch" is inadequate. Phenolic resin is an ingredient which, because of its environmental compatibility, is frequently classified as critical.

The invention has the intent of making available a batch that does not have the cited disadvantages. This batch should be particularly suitable for making repairs on hot refractory surfaces. It should be easily compounded. It should, at least immediately after contact with the still hot surface of the refractory lining, display good fluidity properties, so as to spread uniformly, and with a high density, into and on the damaged places. In addition, it should adhere well to the existing refractory material, and set rapidly, and, in its other properties, to match, to the greatest extent possible, those of the refractory lining material.

In their attempt to fulfill as many as possible of the preceding tasks, the inventors started out on the basis of the following consideration relating to application technology: The batch must, because of the heat, be transported to the site of the repairs from a relatively long distance. The simplest way this is possible is for the material to be mixed, for example in a bag, and for this bag then simply to be tossed onto the affected site. This results in the following additional solution requirements: The material must be more or less dry, because as a liquid medium it can only be compounded under certain conditions, and not, in particular, over a protracted period of time. On the other hand, immediately after arrival at the site of the damage, it must fulfill the desired flow properties, in other words, to present an appropriately fluid phase, and thereafter to adhere well to the repair surface.

None of the mixtures that have been cited for the state of the art meets these requirements. Either the mixtures are aqueous at the start, or their fluidity is only manifested after a certain time delay.

The invention travels an entirely different way, and proposes the following mixture for a refractory ceramic batch:

As its essential component (65–90 M-%), the mixture consists of a non-basic refractory material (in a grain size fraction <15 mm or even <10 mm or <8 mm).

Instead of an aqueous component or a component that releases water under heat, and/or, instead of a pitch, tar or resin, the batch according to the invention includes as additional components either
- a combination of at least one phosphatic and at least one silicate-containing component, or
- a combination of at least one carbon-containing component and at least one silicate-containing component.

These components contain no crystalline water or at least no significant proportion of water; but they melt quickly when exposed to higher temperatures. Deliberately selected are waterless components which nevertheless melt quickly. This means that the components are dry and firm at the outset when being mixed with the refractory matrix material and are combined, for example, in bags. However, this also makes it possible, if the mix (the bag), for example, has been tossed onto a damaged hot refractory lining, for a molten phase to be formed in the mix, due to the intense heat, giving the batch the desired fluidity.

The refractory granulation, in this manner, is provided with a "lubricant," so that the original granular (powdery) mix now attains the desired flow characteristics, and can spread and, for example, flow into cracks or holes.

According to one form of embodiment, the phosphatic or silicatic components should form a molten phase at temperatures >500° C., whereas temperatures above 900° C. are sufficient for many applications.

It is particularly advantageous to select the components such that together they form a eutectic, i.e. go into a molten phase as early as at a temperature that is below the melting point of each individual component. In this way, the desired flow behavior of the mixture can be attained even sooner.

The proportion of the non-basic refractory matrix components may amount to 67 to 84 percent of mass (M-%), or, as per another embodiment form, 70 to 80 M-%.

The proportion of the silicatic components, is, for example, between 2 and 23 M-%, and a proportion >=5 M-% may be selected.

The silicatic component may be present in a grain size of <0.3 mm. Chemically/mineralogically, the silicatic component may, for example, incorporate one or more of the following silicates: calcium silicate, sodium silicate, boron silicate, aluminum silicate. The silicatic component may be prepared as a flour (<63 μm). It may be a pure silicatic glass flour. As well, the silicatic component may be prepared as a glaze or frit.

Insofar as the silicatic component incorporates calcium and sodium silicate (Ca—Na—Silicate), the ratio of the mol constituent $SiO_2/CaO+Na_2O$ may, for example, lie between 30/70 and 90/10, i.e., it may also fall, for example, between 60/40 and 80/20. Moreover, the ratio of the mol-constituent $CaO/Na_2O$ may lie between 10/90 and 90/10, and thus, for example, also between 40/60 and 60/40.

The refractory matrix material may, for example, include one or more of the following components: Sinter alumina, high-grade corundum, normal corundum, MA-spinel (MgO—$Al_2O_3$—spinel), bauxite, and alusite, mullite, zirconium corundum, zirconium mullite, kaolin and/or clay.

In addition, at least one of the following components may be added to the batch mix:

Al $1_2O_3$ (<5 M-%),

MgO (<8–M%), micro-silica (fine-grained silicic acid) (<2 M-%), oil (for example, mineral oil (<4 M-%), where the by-weight percentages shown in parentheses are examples, and may also be higher. Except for the oil, these components have been carefully chosen and employed, so as to create through reaction, and depending on those additives that are responsible for the molten phase, high-melting phases. This achieves stability in the repair material.

Regardless of the nature of the compound, except for the obligatory components named at the outset, the formulation of the components should be such that the mixture forms at least a 15 M-% molten phase no later than at its application temperature. Depending on the respective type of application, the minimum proportion of the molten phase may also be established at >20 M-%.

The carbonaceous component may include, for example, pitch, resin, and/or tar. It is true that these are known as constituents refractory batches for hot repairs, as remarked at the beginning. However, in the known applications, pitch, resin and/or tar constitute the only additional ingredients beside the refractory matrix material, and are solely responsible for the flow characteristics of the batch. On the other hand, these substances have an application, according to the invention, only in one of the alternatives named at the beginning, and beyond that exclusively in combination with at least one silicatic component. Coupled with the criterion according to which the silicatic component should constitute at least 2 M-%, or, according to another version, at least 5 M-%, the result is a corresponding reduction of the pitch/tar/resin proportion, for example, to a minimum lower than or equal to 13 M-%, something that is advantageous, too, from an environmental standpoint.

The cited $Al_2O_3$ may consist of reactive alumina, i.e. highly dispersed (especially fine-grained) aluminum oxide. The cited MgO may consist, for example, of fine-grained MgO (sinter), where the MgO can, in connection with the non-basic matrix material on aluminum oxide basis, form MA-spinels during application.

Micro-silica (fine-grained silicic acid can react with the aluminum oxide of the base material to form mullite.

The phosphatic component, for example sodium phosphate, potassium phosphate, silicon phosphate, is molten not only within the relevant temperature range (hot temperature application), but it also fosters the ceramic binding of the batch, which makes for high strength. The percentage by mass of the phosphate component lies, for example at about <11 M-%.

The cited oil serves especially to keep dust-free the batch prepared exclusively in dry form.

The non-basic refractory matrix component can be replaced, at least partially, by a basic refractory component.

Detailed below are two examples for refractory batches according to the invention. Both are suitable for use in a manner according to the invention for the hot repair of refractory linings of metallurgical melting vessels. Both are prepared in dry form. Both can be produced in sacks and simply thrown on the damaged site of a refractory lining needing repair. After the sack has split open and the material of the mixture is in contact with the still-hot lining, there follows a spontaneous formation of a molten phase between the refractory matrix grains, so that the mass flows spontaneously and fills holes, try cocks or other damaged places on the refractory lining. Both mixtures adhere well to the existing lining, set rapidly, and provide high levels of heat resistance that are comparable to those of the refractory lining.

EXAMPLE 1

| | |
|---|---|
| Normal corundum 0.06–10.0 mm | 74.0 M-% |
| Reactive alumina (<10 μm) | 3.0 M-% |
| MgO sinter 0.04–0.3 mm | 5.0 M-% |
| Micro-silica | 0.5 M-% |
| Ca—Na-Silicate <0.2 mm) | 5.0 M-% |
| Pitch | 9.0 M-% |
| Dust-binding oil | 3.5 M-% |
| | 100.0 M-% |

EXAMPLE 2

| | |
|---|---|
| Sinter alumina 0.045–6.0 mm | 60.0 M-% |
| MA spinels 0.020–1.0 mm | 15.0 M-% |
| Ca—Na-Silicate <0.2 mm | 20.0 M-% |
| Na-Phosphate | 3.0 M-% |
| Dust-binding oil | 2.0 M-% |
| | 100.0 M-% |

The invention claimed is:

1. Process for a hot repair of a refractory lining in a metallurgical vessel by throwing a sack including a non-basic refractory batch consisting of:
   65–90 M-% non-basic refractory material with a grain-size fraction of <15 mm, and 10–35 M-% of a combination of at least one phosphatic and at least one silicatic component, or 10–35 M-% of a combination of at least one C-containing component and at least one silicatic component, as well as 0 to <2 M-% of microsilica; and 0 to <4 M-% of oil, wherein at least one of the phosphatic and silicatic components forms a molten phase at temperatures >500° C., in dry form on a damaged site so that the sack splits and the batch gets in contact with the refractory lining.

2. Process according to claim 1, with the proportion of the non-basic refractory material between 67 and 84 M-%.

3. Process according to claim 1, with the proportion of the non-basic refractory material between 70 and 80 M-%.

4. Process according to claim 1 with the proportion of the silicatic component between 2 and 23 M-%.

5. Process according to claim 1, with the proportion of the silicatic component >=5 M-%.

6. Process according to claim 1, wherein the silicatic component is present in a grain-size fraction <0.3 mm.

7. Process according to claim 1, wherein the silicatic component includes at least one of the following components: calcium silicate, sodium silicate, aluminum silicate, boron silicate.

8. Process according to claim 1, wherein the components of the batch are proportioned in relation to each other so that the batch forms at least 15 M-% of a molten phase at an application temperature.

9. Process according to claim 1, wherein the components of the batch are proportioned in relation to each other such that the batch forms at least 20 M-% of a molten phase at an application temperature.

10. Process according to claim 1, wherein the non-basic refractory material includes at least one of the following components: sinter alumina, high-grade corundum, standard corundum, MA-spinel, bauxite, andalusite, mullite, zirconium corundum, zirconium mullite, kaolin, clay.

11. Process according to claim 1, with the proportion of the phosphatic component <11 M-%.

12. Process according to claim 1, wherein the C-containing component consists at least partly of one of the following components: pitch, tar, resin.

13. Process according to claim 1, with the proportion of the C-containing component <13 M-%.

14. Process according to claim 1, wherein the total quantity of phosphatic and silicatic components is 20–28 M-%.

15. Process according to claim 1, wherein the total quantity of C-containing and silicatic components is 12–18 M-%.

* * * * *